United States Patent

Eng et al.

[11] Patent Number: 5,958,018
[45] Date of Patent: Sep. 28, 1999

[54] WIRELESS SERVICES DATA NETWORK TRANSLATING MAC ADDRESS TO ASYNCHRONOUS TRANSFER MODE (ATM) ADDRESS

[75] Inventors: Kai Yin Eng, Middletown; Zhao Liu, Fords; Malathi Veeraraghavan, Atlantic Highlands, all of N.J.

[73] Assignee: Lucent Technologies Inc., Murray Hill, N.J.

[21] Appl. No.: 08/741,068

[22] Filed: Oct. 30, 1996

[51] Int. Cl.[6] .................................................. H04L 12/00
[52] U.S. Cl. ........................................... 709/246; 455/403
[58] Field of Search .................................... 370/331, 395, 370/397, 310; 395/200.57, 200.58, 200.76; 455/437, 440, 403, 422; 709/227, 228, 246

[56] References Cited

U.S. PATENT DOCUMENTS

| 5,487,065 | 1/1996 | Acampora et al. | 370/60.1 |
| 5,539,744 | 7/1996 | Chu et al. | 370/60 |
| 5,590,125 | 12/1996 | Acampora et al. | 370/397 |
| 5,590,126 | 12/1996 | Mishra et al. | 370/329 |
| 5,742,668 | 4/1998 | Pepe et al. | 379/58 |
| 5,742,905 | 4/1998 | Pepe et al. | 455/461 |
| 5,757,783 | 5/1998 | Eng et al. | 370/315 |
| 5,768,531 | 6/1998 | Lin | 395/200.72 |
| 5,771,459 | 6/1998 | Demery et al. | 455/517 |

*Primary Examiner*—Lance Leonard Barry

[57] ABSTRACT

A wireless services data network supporting the mobility of an Internet Protocol (IP) over ATM networks is implemented such that a joint ATM-layer hand-off and MAC-layer hand-off are respectively used to handle in-session and inter-session mobility. In this way the effect of mobility is localized and transparent to higher-layer protocols. Also, different functions, including the so-called Address Resolution protocol, location of a mobile, and ATM connection, are combined to reduce front-end delay for connectionless packet transmissions in connection-oriented ATM networks.

11 Claims, 9 Drawing Sheets

FIG. 3

REGISTRATION TABLE

| MACi |
|---|
| MACn |
| ⋮ |
| MACix |

FIG. 4

| | |
|---|---|
| APPLICATION | 401 |
| TCP | 402 |
| INTERNET PROTOCOL | 403 |
| 802.11 MAC | 404 |
| 802.11 PHYSICAL | 405 |

FIG. 5

ADDRESS TRANSLATION

| ADDRESS | VPI | VCI |
|---|---|---|
| $m_y$ | VPIa | 3 |
| $m_2$ | VPId | 17 |
| $m_x$ | VPIm | 4 |
| ⋮ | ⋮ | ⋮ |
| $m_j$ | VPIp | 9 |

FIG. 6

| | | |
|---|---|---|
| 602 — | 802.11 MAC | LANE — 603 |
| | | AAL5 — 604 |
| | | ATM — 605 |
| 601 — | 802.11 PHYSICAL | ATM PHYSICAL — 606 |

| | | SIGNALING FIELD | | |
|---|---|---|---|---|
| TYPE | | | | |
| BROADCAST LOCATE | ORIGINATING AP ADDRESS | MAC ADDRESS OF DESTINATION MOBILE | . . . . . . | |

FIG. 8

| LOCATED | ADDRESS OF ORIGINATOR OF LOCATED MESSAGE | MAC ADDRESS OF DESTINATION MOBILE | [VPI/VCI] | . . . |
|---|---|---|---|---|

FIG. 9

| ARP REQUEST | IP ADDRESS OF DESTINATION MOBILE | | . . . . . . | |
|---|---|---|---|---|

FIG. 10

| ARP REPLY | IP ADDRESS OF DESTINATION MOBILE | MAC ADDRESS OF DESTINATION MOBILE | [VPI/VCI] | . . . |
|---|---|---|---|---|

FIG. 11

| HAND-OFF REQUEST | ADDRESS OF NEW AP | MAC ADDRESS OF DESTINATION MOBILE | . . . . . . | |
|---|---|---|---|---|

FIG. 12

| HAND-OFF PROCEED | ADDRESS OF FAR-END AP 1 | VPI/VCI OF OPEN CONNECTION 1 | VPI/VCI OF OPEN CONNECTION 2 | . . . |
|---|---|---|---|---|

FIG. 13

| HAND-OFF SEGMENT AND ASSIGN CHANNELS | OPEN CONNECTION 1 (VPI/VCI) | VPI/VCI NEW_1 | OPEN CONNECTION 2 (VPI/VCI) | VPI/VCI NEW_2 |
|---|---|---|---|---|

FIG. 14

WIRELESS SERVICES DATA NETWORK TRANSLATING MAC ADDRESS TO ASYNCHRONOUS TRANSFER MODE (ATM) ADDRESS

FIELD OF THE INVENTION

The invention relates to interconnecting a plurality of wireless services (mobile network) via a scaleable data network.

BACKGROUND OF THE INVENTION

The well-known Internet Protocol (IP) is a so-called internetwork layer protocol that runs over Ethernet type networks that conform with the well-known IEEE 802.3 standard. That is, Ethernet operates in a broadcasting domain (connectionless mode) in which messages are transmitted over a bus common to a plurality of host modules, i.e., a single cable connected to each of the hosts. Each host monitors the common bus and accepts only those messages bearing its respective address. An illustrative example of such technology as a distribution system (network), shown in the context of a so-called wireless LAN (local area network), is illustrated in FIG. 1. Distribution system 10, which may be an Ethernet type cable, connects directly to a plurality of so-called Access Points (also referred to herein as Access Processors), or hosts, 11-1 through 11-N. Each of the Access Points/Processors (APs) 11 communicates via wireless media with the mobile stations, $m_i$, (e.g., data terminals, such as portable computers, adapted for wireless communication) that are within its respective coverage area 12-$i$ and accepts messages that are transmitted by those mobiles only. Thus, a mobile station, e.g., $m_i$, may send a message to a destination, e.g., mobile station $m_p$, by transmitting the message over the air. One or more APs may receive the transmitted message, but only the AP serving the transmitting mobile, e.g., AP 11-1, accepts the transmitted message, and does so only if the originator identified in the messages is a mobile that is currently being served by AP 11-1. The receiving AP 11, in turn, forwards the message over distribution system 10, which is monitored by all of the APs 11. The AP 11 serving the mobile identified as the destination in the message accepts the message from distribution system 10. The identified AP 11 then retransmits the message over the air to the destination mobile, e.g., mobile $m_p$.

The delivery of a message within the system of FIG. 1 is predicated on the system "knowing" which $AP_i$ is serving a particular mobile $m_i$. The system obtains this information through a procedure known as "association", which results in generating a mapping between a particular mobile $m_i$ and a serving Access Processor, $AP_i$. Once the association between a mobile and Access Processor is established, then the mobile may use distribution system 10 to communicate (via its associated AP) with another mobile.

A mobile, e.g., $m_i$, initiates the association process when it is "turned on" and begins to scan for a beacon signal that is periodically transmitted by each $AP_i$. The beacon signal is a so-called management frame which, inter alia, identifies the $AP_i$, its capabilities, time stamp, etc. The mobile $m_i$ locks onto the strongest of the beacon signals that it receives and transmits a management frame identifying, inter alia, (a) the frame as an association message, (b) a so-called MAC address associated with the mobile $m_i$ and (c) the address of the $AP_i$. The $AP_i$, in turn, associates itself with that mobile. At that point, mobile $m_1$, e.g., $m_1$, may begin to communicate (via $AP_i$, e.g., AP 11-1) with another mobile or a terminal connected to distribution system 10.

It is likely that during such communication, one mobile may migrate to a coverage area served by another AP. For example, if mobile $m_1$ that is communicating with mobile $m_p$ leaves coverage area 11-1 and enters coverage area 11-2, then mobile $m_1$ has to establish an association with AP 11-2 to continue its communications with mobile $m_p$. Mobile $m_1$ does this in response to receiving the beacon management frame transmitted by AP 11-2. In response to that beacon signal, mobile $m_1$ transmits a reassociation management frame identifying, inter alia, itself, the AP that it is currently associated with (AP 11-1) and the AP that it desires to reassociate with, namely AP 11-2. The latter AP, in turn, confirms the reassociation and notifies AP 11-1 via distribution system 10 that mobile $m_1$ is now associated with AP 11-2. At that point, the communications between mobiles $m_1$ and $m_p$ may continue.

(Illustrative association and reassociation procedures as well other "handshaking" procedures/protocols that may be used in the system of FIG. 1 are described in the IEEE Draft Standard 802.11 pertaining to wireless LANs available from IEEE Standards Department, 445 Hoes Lane, P.O. Box 1331, Piscataway, N.J., which is herein incorporated in its entirety by reference. See especially sections 5.4.2.2 (association), 5.4.2.3 (reassociation) and 5.4.2.4 (disassociation) found at pages 19 to 20 of the cited Draft standard.)

An Asynchronous Transfer Mode (ATM) type network does not typically conform with the aforementioned 802.11 standard, since it is not a shared network in the sense that an Ethernet network is a shared (broadcast) network. That is, in an ATM network, switches/hosts communicate with one another via virtual connections, and, therefore, except for conventional broadcast messages, a host in an ATM network receives and transports messages via respective virtual connections, rather than a bus common to the host. Thus, if an ATM network were used to implement distribution system 10, then mobile $m_1$ would be unable to communicate with mobile $m_p$ after mobile $m_1$ reassociates with AP 11-2. The reason for this is that, as a result of the initial association, a virtual connection would have been established between AP 11-1 and AP 11-N to establish a communication path from mobile $m_1$ to mobile $m_p$ (see FIG. 1). A virtual connection would also be established in the reverse direction to AP 11-1. Herein lies the nub of the problem. Messages transmitted by mobile $m_p$ to mobile $m_1$ after the reassociation occurs would still be transported over the reverse virtual connection to AP 11-1, a connection inaccessible to AP 11-2. Thus, the messages would not be delivered to mobile $m_1$. Moreover, if just prior to the reassociation, AP 11-1 still had a number of messages destined for mobile $m_p$ stored in its queue, then it is likely that AP 11-1 might attempt to deliver the messages via the established virtual connection. If such messages are transported to AP 11-N via the established virtual connection, then it is likely that they would be out of sequence with messages that AP 11-2 transports to AP 11-N on behalf of mobile $m_1$ for delivery to mobile $m_p$.

SUMMARY OF THE INVENTION

In accordance with the principles of the invention, we provide a set of protocols that allow an ATM network to operate as a distribution system within a system of the type illustrated in FIG. 1 so that a logical network connection from a first mobile station to a second mobile station may be established via respective first and second access processors and remains so established as long as traffic is being sent over the connection. If thereafter the second mobile station moves to an area served by a third access processor, the latter processor, in accordance with the inventive protocol, invokes a hand-off phase which notifies the second access processor that the second mobile unit is now associated with the third access processor, and, if the logical connection from the first access processor to the second access processor is still open, then the third processor includes in such notification the identity of a logical connection within a logical network path provisioned from the second access processor to the third access processor that may be used to send messages queued at the second access processor and addressed to the second mobile station to the third access processor for delivery to the second mobile station.

Also, the third access processor, in accord with the inventive protocol, invokes a home-update phase, in which a notification message that is sent to the first access processor identifies a logical connection within a logical network path provisioned from the first access processor to the third access processor that may be used to send messages to the second mobile station via the third access processor directly. The access processors then, in accordance with the inventive protocol, gracefully reroute in proper sequence messages destined for the second mobile unit which are queued at the second access processor and which are newly received from the first processor.

These and other aspects of the inventive protocol will be made apparent in the ensuing detailed description and accompanying drawings.

BRIEF DESCRIPTION OF THE DRAWING

In the drawing:

FIG. 3 illustrates an example of so-called registration table used in establishing an association between an Access Processor of FIG. 2 and wireless mobile unit served by the Access Processor;

FIG. 4 is an illustrative example of a protocol stack invoked at a wireless mobile of FIG. 2 to transmit a message to an Access Processor;

FIG. 5 is an illustrative example of an address translation table;

FIG. 6 is an illustrative examples of a protocol stack invoked at an Access Processor of FIG. 2 to process an incoming message;

FIGS. 8–14 are illustrative examples of control/signaling messages that are exchanged between the Access Processors of FIG. 2 in the processing of various aspects of the invention;

DETAILED DESCRIPTION

Figure 1:
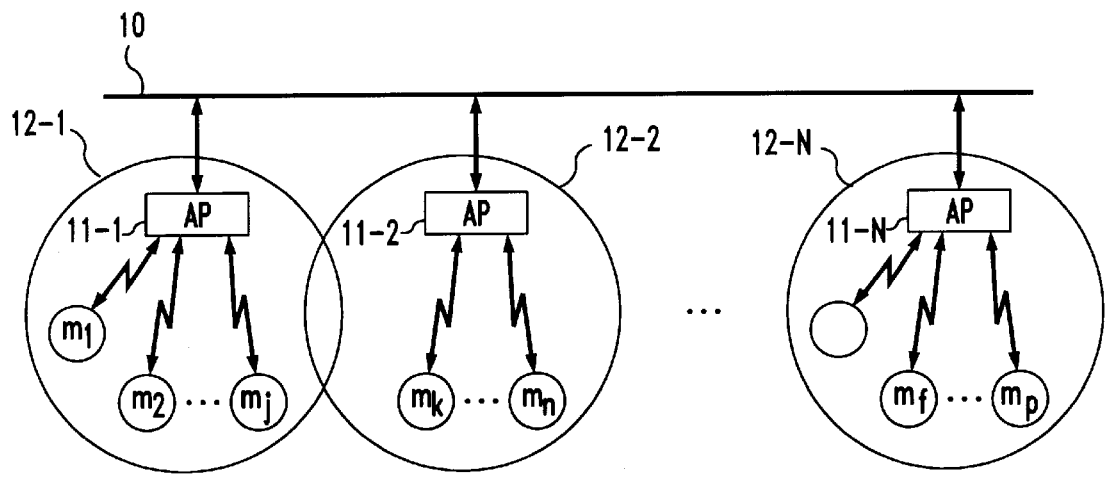
FIG. 1 illustrates a prior art distribution system employing a wired broadcast network to interconnect a plurality of local wireless networks.
Figure 2:
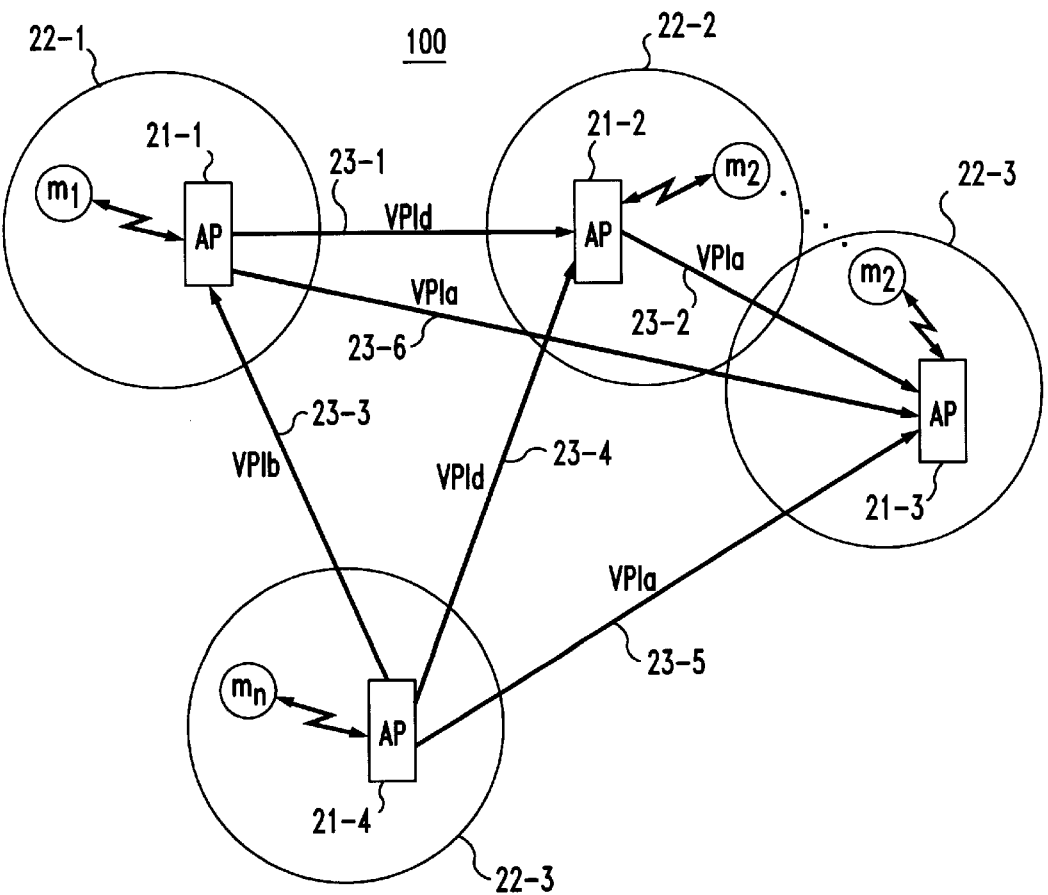
FIG. 2 illustrates a distribution system arranged in accordance with principles of the invention.

FIG. 2 illustrates an exemplary packet network (distribution system) formed by a plurality of logical links, e.g., links 23-1 through 23-6, interconnecting a plurality of Access Processors (APs), four of which are shown in the FIG., namely APs 21-1 through 21-4. It is noted that each such link represents one or more physical connections between a pair of APs, and may be any one of the many different types of transmission medium, e.g., optical fiber, T1 carrier, coax, etc. Also, network 100 may operate in accordance with any one of the well-known data transport technologies, preferably the well-known Asynchronous Transport Mode (ATM), in which data is transported in a cell format comprising a header of five bytes and a payload of 48 bytes. Included in the header is particular routing information formed by a Virtual Path Identifier (VPI) and a Virtual Channel Identifier (VCI), as is well-known to the art. That is, a VPI identifies a virtual path from an originating to a terminating switch and the VCI identifies a particular circuit/channel within the virtual path. Thus, a number of VCIs may be associated with a particular VPI.

In accordance with a feature of the invention, a VPI tree structure is provisioned at a particular root AP, e.g., AP 21-3, from a respective set of other APs, e.g., AP 21-1, for the purpose of sending data cells from the other APs to the root AP, as represented in the FIG. by $VPI_a$. Similarly, another, but different, $VPI_d$ has been respectively provisioned from AP 21-4 and AP 21-1 to the root AP 21-2.

Assume that an association has been established, in the manner discussed above, between wireless mobile m, and AP 21-1 serving area 22-1, and, as a result of the association, AP 21-1 enters the identity, e.g., MAC address, assigned to mobile $m_1$ in a registration table, an example of which is shown in FIG. 3. Similarly, an association may be established between wireless mobile $m_2$ and AP 21-2. A registration table, more particularly, identifies the wireless mobiles (MAC address) that are being served by the associated AP. Assume that mobile $m_1$ then transmits a message to wireless mobile $m_2$, in which messages transmitted by a mobile are formatted in accordance with a predetermined format, preferably the MAC frame format defined by the aforementioned 802.11 standard. As an aside, the processing of a message at a user's wireless mobile, e.g., mobile $m_1$, is done in accordance with a predetermined protocol stack. An example of such a stack is shown in FIG. 4. Specifically, a message generated by a particular application (application layer 401) is passed to conventional TCP layer 402 which, inter alia, (a) tracks the Internet session, (b) performs error detection on received messages and (c) tracks acknowledgments associated with transmitted messages. At conventional IP layer 403, a header containing, inter alia, the respective IP addresses of the originator of the message and destination is generated. The header and message are then formed into a so-called datagram, which is then passed to MAC layer 404 together with the MAC address obtained as a result of using the Address Resolution Protocol (ARP), which forms the datagram into a MAC frame, which is then transmitted at the physical layer 405.

(The following discussion also makes reference to the flow chart charts shown in FIGS. 15 through 21.)

Figure 15:
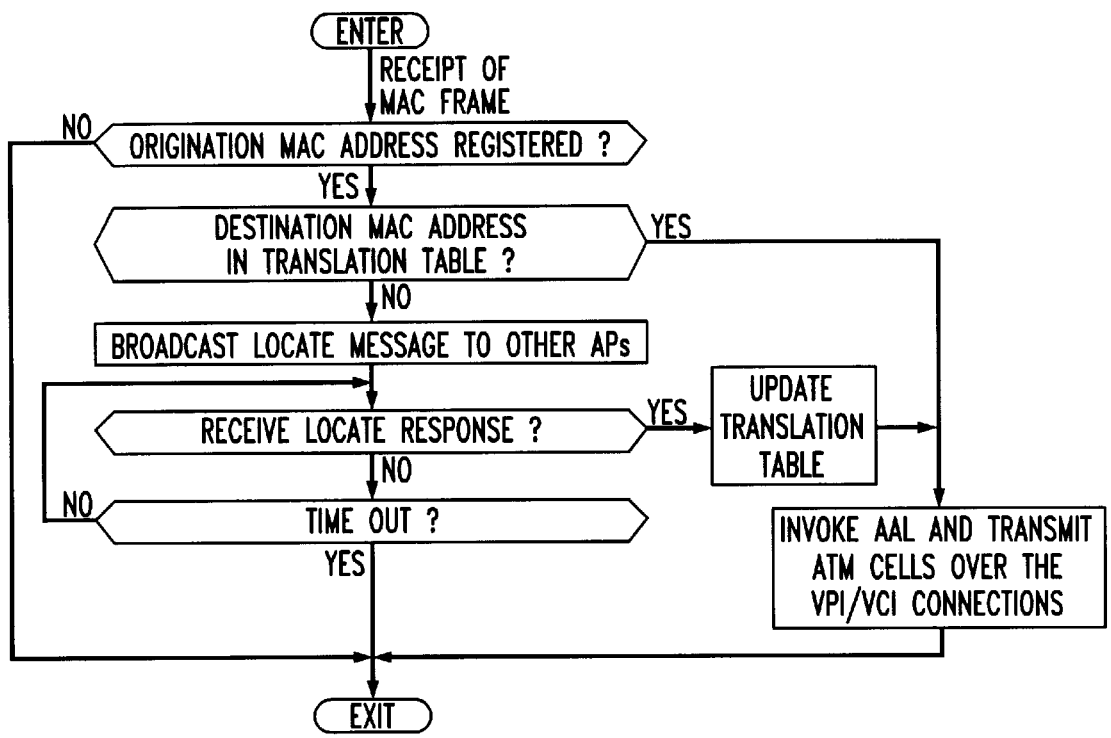
FIGS. 15–21 illustrate in flow chart form the programs which implement the various aspects of the invention in the Access Processors of FIG. 2.
Figure 16:
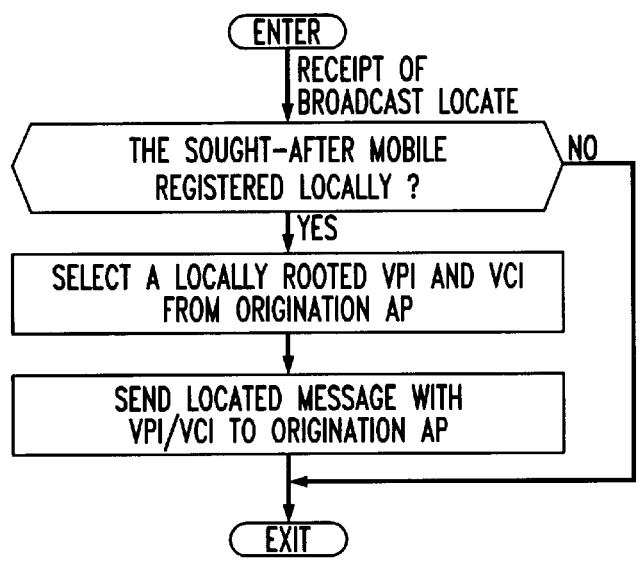

When a message from a mobile is received at the physical layer (e.g., 802.11 physical layer) of the protocol, FIG. 6, implemented at AP 21-1, it is passed to LAN Emulation layer (LANE) via MAC layer 602. LANE layer 603, in turn, checks if the origination MAC address belongs to a mobile that is being served by the associated AP (FIG. 15). If not, then LANE layer 603 discards the MAC frame. If so, then layer 603 uses a conventional translation table to map the destination address (e.g., MAC address) into an address identifying a virtual circuit connection (VPI/VCI) that may be used to transport the message over the associated ATM network. If the translation table does not contain the information necessary to perform the required mapping, then LANE layer 603 of AP 21-1 (origination AP), in accord with an aspect of the invention, forms a so-called "locate" message containing the MAC address of the destination mobile $m_2$ and passes the message to physical layer 606 (via AAL5 604 and ATM 605) so that the locate message may be broadcast to the other APs in the network in a conventional manner. (An illustrative example of locate message is shown in FIG. 8, in which a type field identifies the locate message and in which a signaling field identifies, inter alia, the originator of the message and sought-after mobile.)

When an AP in the network receives its copy of the locate message (FIG. 16), it checks to "see" if the MAC address contained therein identifying the sought-after mobile is stored in its associated registration table. If not, then the AP discards the message. If so,—meaning that an association between the AP and sought-after mobile had been established—then the receiving AP returns a message (FIG. 9) containing its address and the address of the sought-after mobile to the originating AP, namely AP 21-1. The receiving AP, i.e., AP 21-2, also includes in the message the address of the VPI rooted at the AP, e.g., $VPI_d$, and identity of a virtual circuit (VCI) within that VPI that may be used to send messages to the sought-after mobile, $m_2$. Upon receipt of the latter message (FIG. 15), ATM physical layer 606 of originating AP 21-1 passes the message upward to LANE 603, which stores the $VPI_d$ and VCI contained in the received message in a translation table in association with the mobile $m_2$ MAC address. An illustrative example of the latter table is shown in FIG. 5, in which the address for mobile $m_2$ is mapped illustratively into $VPI_d$ and VCI of 17.

LANE layer 603 of AP 21-1 then continues the processing of the MAC frame addressed to mobile $m_2$ that it received from mobile $m_1$ by passing the frame to conventional AAL5 layer 604. Layer 604 then divides the MAC frame including the MAC frame header into segments that will form the payload of respective ATM cells and passes the segments to ATM layer 605 which prepends a conventional ATM header to each such payload and then passes the result to physical layer 606 for transmission to the destination over link 23-1. ATM nodes/switches (not shown) that may be disposed in that link forward the transmitted cell(s) toward its destination (AP 21-2) in a conventional manner. AP 21-2 processes the received cell in accordance with the protocol stack illustrated in FIG. 6, but in the opposite order, such that a MAC frame is formed at layer 603 and then transmitted to mobile $m_2$ via layers 601 and 602. Mobile $m_1$ may then continue to send messages to mobile $m_2$ in the described manner. (Note that a communication path from mobile $m_2$ to mobile $m_1$ may be established in a similar manner.)

Figure 17:
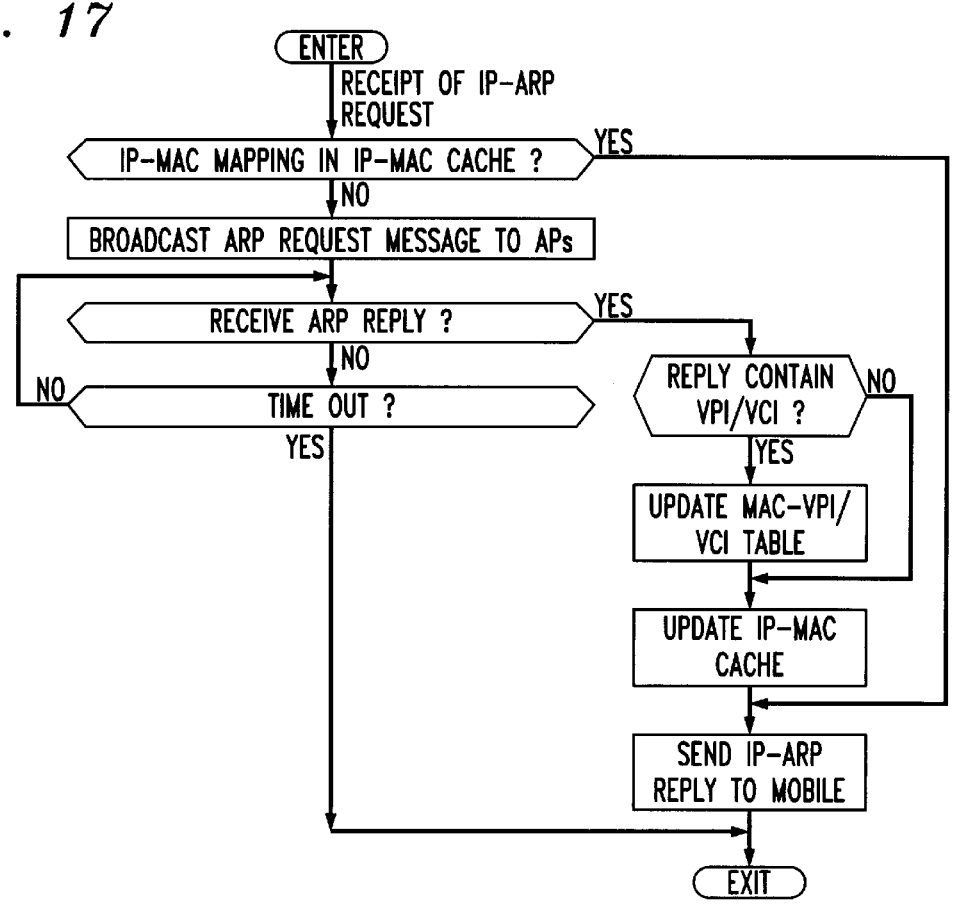
Figure 18:
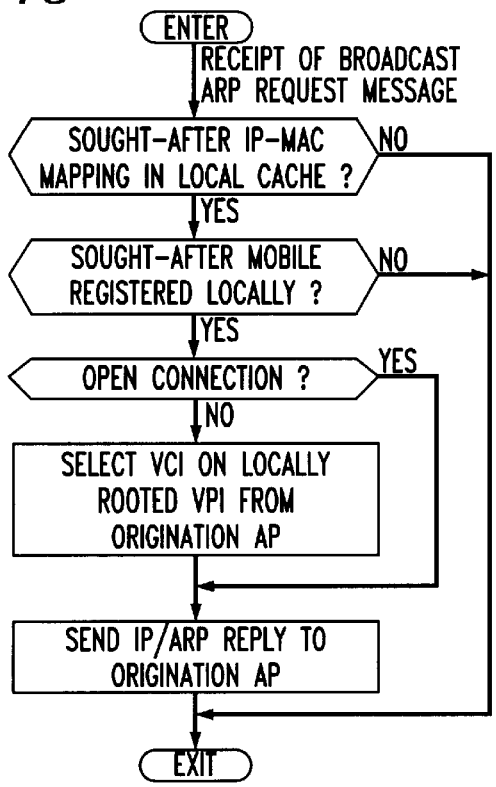
Figure 19:
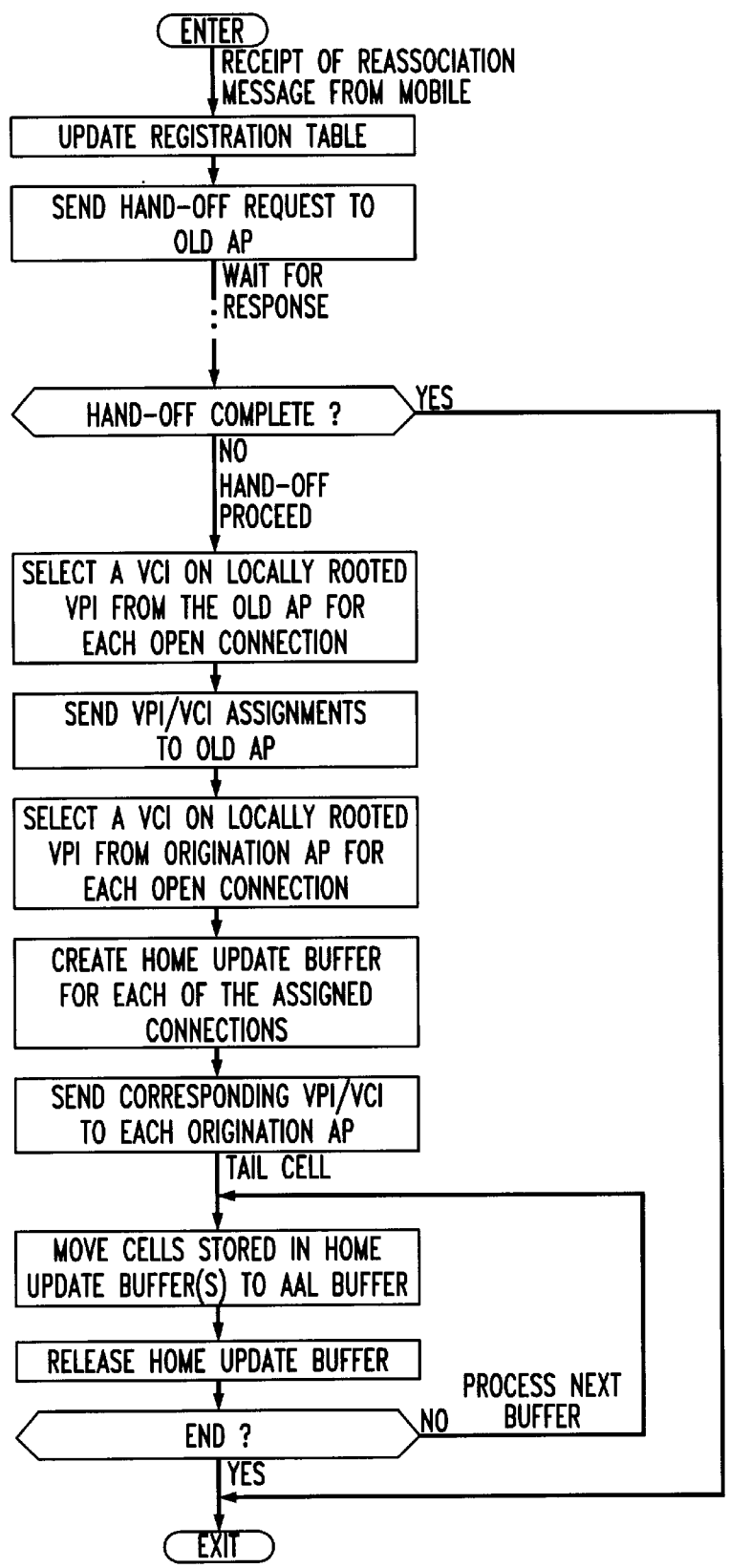
Figure 20:
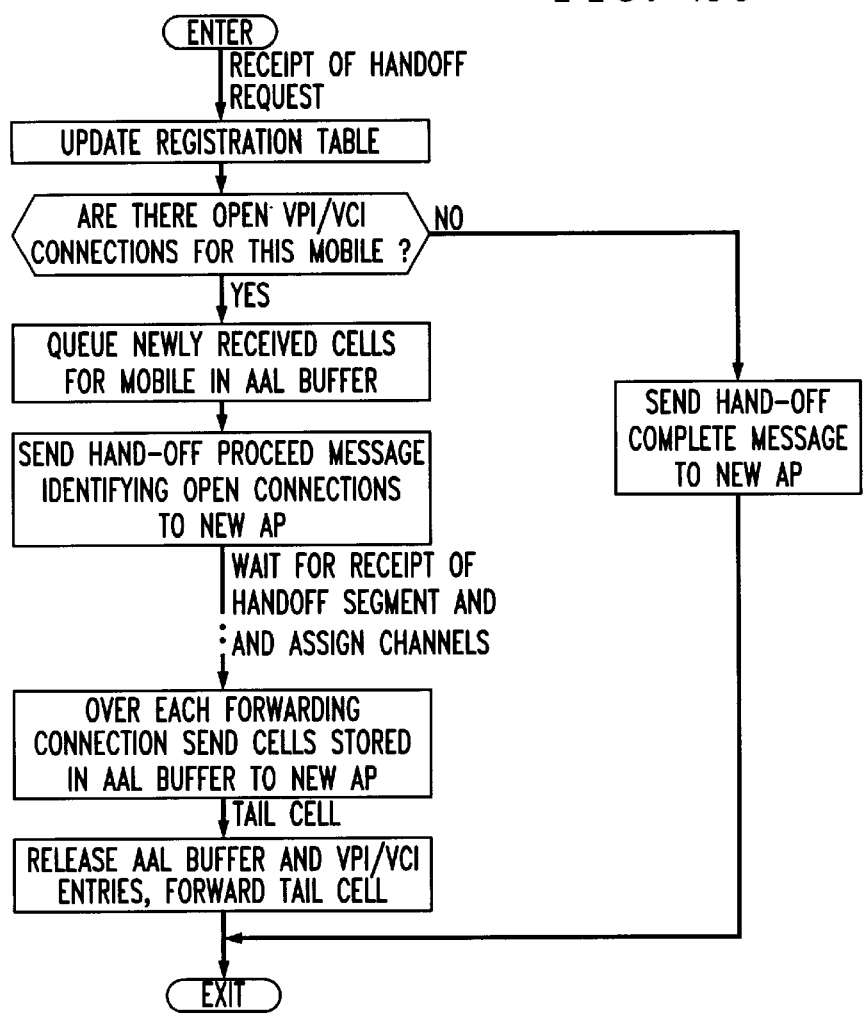
Figure 21:
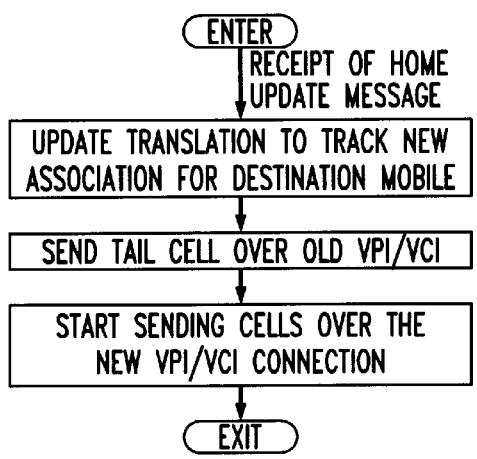

If, in the above illustrative example, AP 21-1 does not receive within a predetermined period of time a response to the locate message that it broadcasts, then AP 21-1 discards the message addressed to mobile $m_2$. Also, if mobile $m_1$ only "knows" the IP address associated with mobile $m_2$, then mobile $m_1$ may obtain the mobile $m_2$ MAC address by sending an IP-ARP (Internet Protocol-Address Resolution Protocol) request containing the pertinent IP address with a request for the associated MAC address. If, in response to receipt of the IP-ARP request, AP 21-1 (i.e., LANE layer 603, FIG. 6) finds that its cache of bindings between MAC and IP addresses does not contain the MAC address for mobile $m_2$, then AP 21-1 broadcasts a conventional Ethernet type Address Resolution Protocol (ARP) message over the ATM network (FIG. 17). An illustrative example of a so-called ARP message is shown in FIG. 10, which includes, inter alia, a code in the type field identifying the message type, and IP address of the destination (sought-after) mobile.

In accord with an aspect of the invention, the only AP that responds to the ARP message is the AP that is associated (registered) with sought-after mobile $m_2$. Thus, in the instant illustrative example, AP 21-2 responds to the message since it is currently associated with mobile $m_2$. In doing so (FIG. 18), the response message that AP 21-2 returns includes the MAC address of mobile $m_2$. The response message may also include, in accord with an aspect of the invention, the identity of a logical connection, e.g., connection $VPI_d$ and an associated VCI, rooted at AP 21-2 that AP 21-1 (mobile $m_1$) may use to transport messages to mobile $m_2$ via the associated ATM network if such connection does not exist. An illustrative example of the latter message is shown in FIG. 11. Upon receipt of the latter message, AP 21-1 updates its binding cache to show the binding between the IP and MAC addresses associated with mobile $m_2$. AP 21-1 sends the binding between the IP and MAC addresses over the wireless media to mobile $m_1$ and also stores the address of the logical connection contained in the received message in association with the mobile $m_2$ in its translation table, FIG. 5.

It is likely that while mobile $m_1$ is communicating with mobile $m_2$, mobile $m_2$ may leave the coverage area served by AP 21-2 and enter a coverage area served by another AP, e.g., AP 21-3. In that case, mobile $m_2$ will then receive the beacon signal transmitted by AP 21-3 and recognize that it has entered the coverage area served by the latter AP. Mobile $m_2$ will thus reassociate itself with AP 21-3 and will do so by sending a management frame reassociation message to AP 21-3 to move the current association from AP 21-2 to AP-21-3 and to update the mapping between AP 21-3 and mobile $m_2$, as is disclosed in the aforementioned 802.11 proposed standard. Besides the aforementioned information message, mobile $m_2$ includes in the management frame reassociation message the identity of the AP that it is currently associated with, namely, AP 21-2. Upon receipt of the latter message, AP 21-3 (FIG. 19) updates its registration table and sends to AP 21-2 a signaling message noting that mobile $m_2$ is now associated with AP 21-3. (An illustrative example of such a signaling message is shown in FIG. 12.) AP 21-2, in response to the notice of the reassociation (FIG. 20), updates its registration table to show that it is not longer associated with mobile $m_2$. AP 21-2 then consults its address translation tables to "see" if there are open logical connections associated with mobile $m_2$. If there are none, then AP 21-2 sends a message (hand-off complete) to that effect to AP 21-3.

Figure 7:
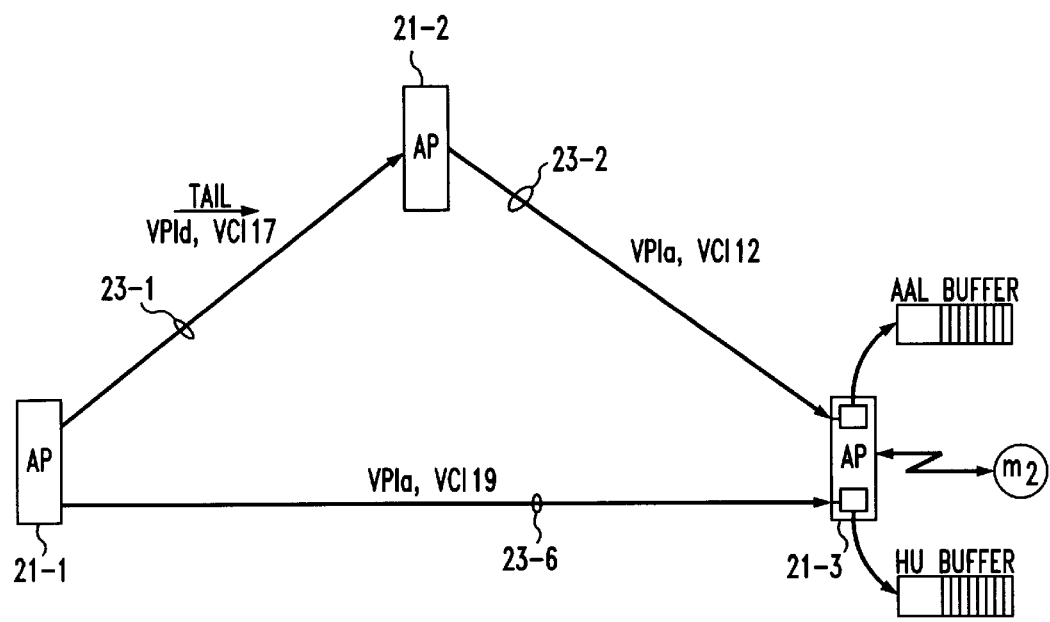
FIG. 7 is a simplified block diagram of FIG. 2 to illustrate a mobile unit hand-off procedure defined in accordance with the principles of the invention.

If at least one such connection is still open, then AP 21-2 forms a signaling message identifying, inter alia, (a) each open connection, i.e., $VPI_d$ and VCI of 17, (b) the AP(s) connected to the other end of each such connection, i.e., AP 21-1, and (c) MAC address of mobile $m_2$. In addition, AP 21-2 (a) stores any ATM cells that it receives over the connection in an AAL layer buffer, rather than attempting to reassemble the cells into a frame and transmitting the frame to mobile $m_2$, and (b) waits for a message from AP 21-3 identifying a forward connection that AP 21-2 may use to forward the received ATM cells to AP 21-3 for delivery to mobile $m_2$. (An illustrative example of the signaling message that AP 21-2 sends to AP 21-3 is shown in FIG. 13. The signaling message assumes that there are two open connections, a first connection of $VPI_d$, VCI 17 (as discussed above) and a second connection of $VPI_d$, VCI 8 from AP 21-4, in which the second connection is being used to transport information from another facility served by AP 21-4 to mobile $m_2$.) AP 21-3, responsive to receipt of the hand-off proceed message from AP 21-2 (FIG. 19), returns in a signaling message the identity of a logical connection within the VPI tree rooted at AP 21-3 and extending from AP 21-2 (e.g., an address having a VCI of 12 within $VPI_a$) that may be used to forward to AP 21-3 any ATM cells stored in the aforementioned AAL buffer as well as any ATM cells that AP 21-2 receives via $VPI_d$, VCI 17. The message also includes the identifier of a second logical connection from the VPI tree rooted at AP 21-3 that may be used to forward ATM cells received for mobile $m_2$ via the logical connection extending from AP 21-4. (An illustrative example of the latter signaling message which pairs each such open connection with a logical connection to AP 21-3 is shown in FIG. 14.) AP 21-2, in turn, unloads the ATM cells it has stored in its AAL5 buffer on a first in, first out basis and forwards the cells over the logical connection provided by AP 21-3. AP 21-3 stores the cells as they are received over that logical connection in its own AAL5 buffer and begins to construct MAC frames from the stored cells for delivery to wireless mobile $m_2$. Also, in response to the message identifying the open connection(s) extending from AP 21-1, AP 21-3 sends a "home update" signaling message to AP 21-1 which, inter alia, (a) indicates that mobile $m_2$ is now associated with AP 21-3 and (b) identifies a logical connection within a VPI tree rooted at AP 21-3 and extending from AP 21-1, e.g., a VCI of 19 within $VPI_a$, that may be used to send data from AP 21-1 to mobile $m_2$ directly. Upon receipt of the latter message, AP 21-1 (FIG. 21) updates its address translation table so that it reflects the new logical connection associated with mobile $m_2$. AP 21-1 also sends a so-called "tail" cell over the $VPI_d$, VCI 17 connection to AP 21-2 and starts the sending of ATM cells carrying data addressed to mobile $m_2$ over logical connection VCI 19 within $VPI_a$. AP 21-2, in turn, loads the tail cell into its AAL buffer, and terminates the logical channel within $VPI_d$ (e.g., VCI 17) that AP 21-1 was using to transport data to mobile $m_2$ via AP 21-2. AP 21-2 releases the AAL5 buffer that it was using after it forwards the tail cell (i.e., the last cell in that buffer) over VCI 12 of $VPI_a$. Also, AP 21-1 transports all new ATM cells to AP 21-3 via VCI 19 of $VPI_a$. That segment of the network of FIG. 2 involved in the association/forwarding process is shown in FIG. 7 for clarity and convenience. AP 21-3 proceeds similarly with respect to messages that are received via the second logical connection and similarly notifies AP 21-4.

Following the foregoing, AP 21-3 invokes what we call a "Home" update (HU) phase (FIG. 19) in which AP 21-3 stores cells received via VCI 12 of $VPI_a$ in an AAL5 buffer, and stores cells received via VCI 19 of $VPI_a$ (i.e., cells received directly from AP 21-1) in a HU buffer, as shown in FIG. 7. AP 21-3 services the cells it stores in its AAL5 buffer first by constructing MAC frame messages from those cells for delivery to wireless mobile $m_2$. When it encounters the tail cell that was received from AP 21-2 and loaded in the AAL5 buffer it (a) releases VCI 12 of $VPI_a$ and (b) begins to unload cells from the HU buffer and (c) constructs MAC frame messages from those cells for delivery to mobile $m_2$, all in accordance with various aspects of the invention. AP 21-3 also invokes a "Home" update phase and proceeds similarly with respect to AP 21-4.

Figure 22:
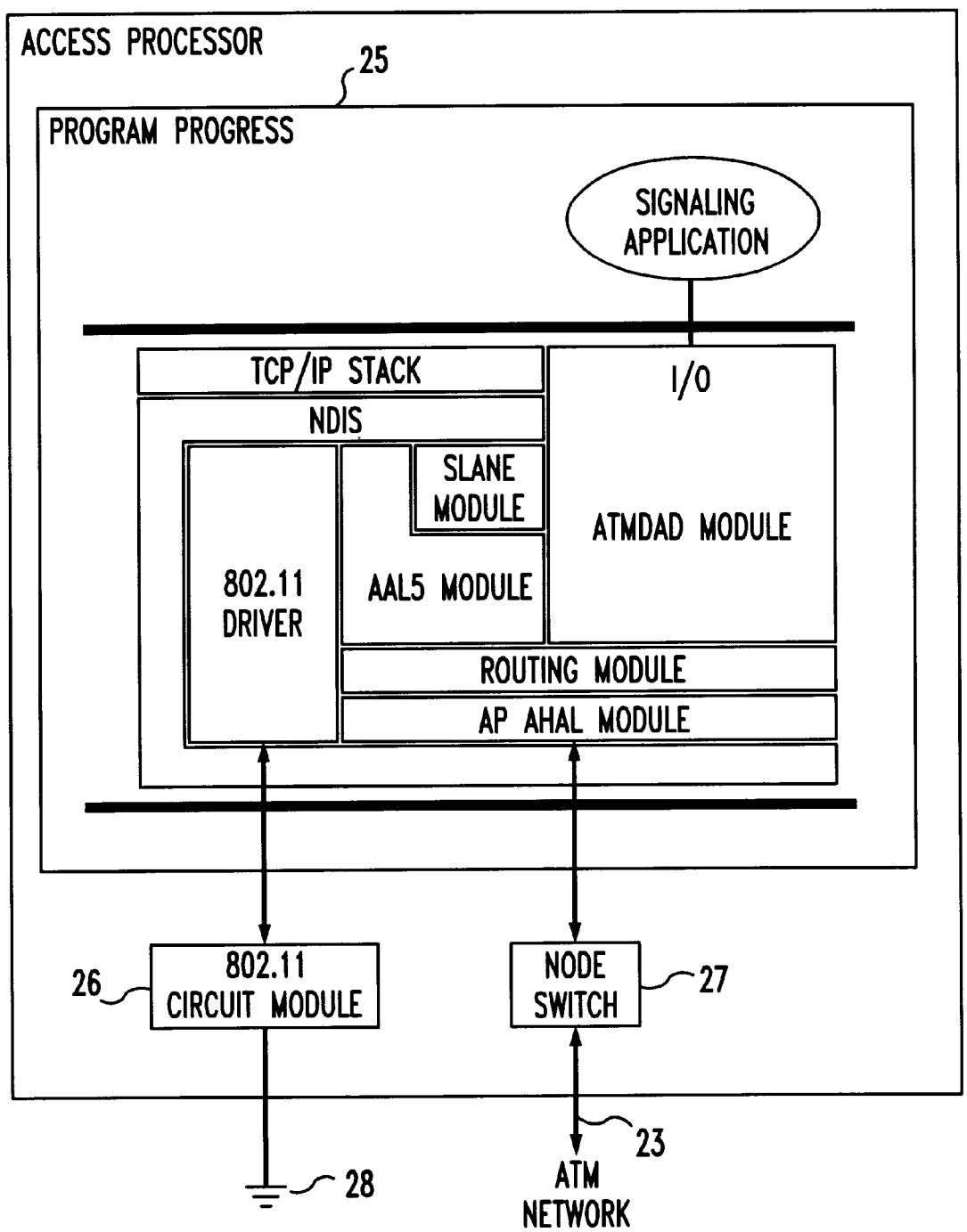
FIG. 22 is a broad block diagram of an Access Processor of FIG. 2.

A broad block diagram of an access processor is illustrated in FIG. 22. Access processor 21, more particularly includes, inter alia, 802.11 circuit module 26, node switch module 27 and program memory 25 which controls the operation of modules 26 and 27. 802.11 circuit module provides an interface between access processor and a mobile unit that communicates with the access processor via antenna 28. To that end, module 26 implements the afore- mentioned 802.11 protocol in access processor 21 to process MAC frames exchanged with mobiles served by the associated AP. Thus, upon receipt of a MAC frame from a mobile via antenna 28, module 26 determines if the MAC frame is addressed to a local application within the TCP/IP stack of the associated AP or is addressed to another mobile. If the former case, then the MAC frame is delivered to the IP layer. For the latter case, the software that implements the Network Driver Interface Specification (NDIS) wrapper, which implements a standard application programming interface, e.g., the wrapper implemented in the well-known Windows NT, to provide an interface between the protocol layers and device drivers, that is, the protocol layers communicate with the device drivers through the NDIS layer. Thus, for the instant case, the NDIS layer redirects the received MAC frame to the software (SLANE) that implements the LAN emulation software. The latter software then determines if the MAC frame is addressed to a locally served mobile or a mobile served by another AP. The SLANE software, more particularly, implements the aforementioned features, such as the ARP, locate, association and reassociation functions; hand-off procedures as well as managing the various registration and translation tables. If the MAC frame is addressed to a mobile served locally by the associated AP, then the SLANE module passes the frame to the 802.11 driver module. The latter module then causes its associated circuit module 26 to transmit the frame to the destination mobile via antenna 28.

If the SLANE module cannot determine the routing for the MAC frame, then, as discussed above, it launches a broadcast locate to acquire the location and thus a rooted VPI/VCI that may be used for such routing. Assuming that the received MAC frame is addressed to mobile served by another AP such routing is known, i.e., it is stored in the translation table, then the SLANE software passes the routing information (VPI and VCI) to the routing module software and passes the MAC frame to conventional AAL5 software, which then segments the frame into cells and forwards each cell, in turn, to the routing module software. The latter software appends the routing information to each cell it receives from the AAL5 module and delivers the result to the AHAL (ATM Hardware Abstraction Layer) software module. The routing module also processes ATM cells received from other APs. In doing so, the routing module determines if the received cell is address to an application residing in the associated AP, a locally served mobile, or is addressed to another AP. For the latter case, the routing module reroutes the received cell to its destination via node switch 27. For the instant illustrative example, the routing module identifies the physical media, e.g., optical fiber, supporting the identified VPI/VCI routing and passes the cell and identity of the physical media to node switch 27 via the AHAL software module.

Node switch 27, which may be, for example, a simple 2=2 ATM switch interfaces AP 21 with the ATM network. Accordingly, then node switch 27 transmits the cell that it receives via the above software modules over the identified physical media, e.g., media 23. Conversely, node switch 27 passes cells that it receives via the physical media to the routing software module via the AHAL module which provides an interface between node switch 27 and the routing software.

The foregoing is merely illustrative of the principles of the invention. Those skilled in the art will be able to devise numerous arrangements, which, although not explicitly shown or described herein, nevertheless embody those principles that are within the spirit and scope of the invention.

For example, it is clear that the claimed invention may be readily adapted to operate with a wired network serving stationary data terminals and the like.

We claim:

1. A method of processing communications received from a wireless station for delivery to an intended destination via an Asynchronous Transfer Mode (ATM) network comprising a plurality of base stations each serving a plurality of wireless stations within a respective coverage area, said communications being received by a base station serving the coverage area in which the wireless station is currently located, said method comprising the steps of receiving at a first one of the base stations a datagram originated by one of the wireless stations and addressed to a second one of the wireless stations not within the respective coverage area, translating the address into an identifier identifying a virtual circuit connection that may be used to transport the datagram to the second wireless station over the ATM network, dividing the datagram into a plurality of segments, and prepending an ATM header containing at least the identity of said virtual circuit connection and said address to each of the segments to form respective ATM cells, and transmitting each of the cells over the virtual circuit connection.

2. The method of claim 1 further comprising the steps of responsive to said datagram being a request for an Internet-Protocol-address-resolution for said second wireless station and responsive to the first base station having only the Internet Protocol address assigned to said second wireless station, broadcasting an Address-Resolution-Protocol message over said ATM network, receiving the Address-Resolution-Protocol message at the second base station, forming a message containing at least a MAC address assigned to the destination and sending the formed message as an ATM cell to the first base station via the ATM network, and receiving the message containing the MAC address at the first base station, and storing the address in memory in association with the IP address for the second wireless station and sending the MAC address to the first wireless station in a datagram.

3. The method of claim 2 further comprising the steps of including an identifier identifying said virtual circuit connection in the message that the second base station forms, and receiving the message at the first base station, and storing the identifier in memory.

4. The method of claim 1 wherein the second wireless station is a mobile unit and wherein said method further comprises the steps of responsive to the second wireless station relocating to an area served by a third one of the base stations, associating the second wireless station with the third base station, notifying the second base station that the second wireless station is now associated with the third base station, responsive to the notification and responsive to an open connection from the first base station to the second base station that is still active for receiving messages originated by the first wireless station and addressed to the second wireless station, sending a message to the third base station identifying the active connection, and receiving the latter message at the third base station, and sending to the second base station a message identifying a virtual connection within a virtual path provisioned from the second base station to the third base station that may be used to send messages addressed to the second wireless station and queued at the second base station to the third base station for delivery to the second wireless station in the form of datagrams.

5. The method of claim 4 further comprising the steps of receiving the message identifying the active connection, sending to the first base station a message identifying a virtual connection within a virtual path provisioned from the first base station to the third base station that may be used to send messages to the second wireless station via the third base station.

6. The method of claim 5 further comprising the steps of receiving the message identifying the virtual connection within the virtual path provisioned from the first base station to third base station, and sending a tail message over the virtual connection to the second base station and then sending new messages addressed to the second wireless station that are received at the first base station to the third base station via the identified virtual connection to the third base station.

7. The method of claim 6 further comprising the steps of receiving the tail message, and storing the tail message in sequence in the queue at the second base station, storing messages addressed to the second wireless station and received from the first and second base stations in respective first and second queues at the third base station, and assembling in sequence the messages stored in the second queue and then the first queue to form one or more datagrams and transmitting each datagram as it is formed to the second wireless station.

8. The method of claim 7 further comprising the step of responsive to unloading the tail cell from the second queue, terminating the virtual connection within the virtual path provisioned from the first base station to the second base station, and then from the second base station to the third base station.

9. The method of claim 1 further comprising the step of receiving the transmitted ATM cells via said virtual connection, assembling the received cells into the datagram and sending the datagram to the second wireless station.

10. The method of claim 1 further comprising the steps of if the translation does not contain the identity of the virtual circuit connection for the address of the second wireless station, then broadcasting a locate message containing the address over the ATM network, and proceeding to the step of dividing and prepending upon receiving a message identifying the virtual circuit connection.

11. A method of operating a communications system comprising a plurality of access processors each serving a plurality of wireless communications units, in which each of the wireless communications units is assigned a unique MAC address and a unique Internet Protocol (IP) network address, said method comprising the steps of receiving at a first one of the access processors a message originated by a first one of the wireless communications units and containing only the IP address of a second one of the wireless communications units as a destination address;

forming an address resolution message containing at least the IP address of the second wireless communications unit and broadcasting the resolution message over the communications system;

receiving from a second one of the access processors a message identifying at least (a) an association between the second access processor and the second wireless communications units; (b) a virtual connection provisioned within a virtual path provisioned from the first access processor to the second wireless communications unit; and (c) the unique MAC address assigned to the second wireless communications unit; and inserting the MAC address in the message received from the first wireless communications unit and sending the resulting message to the first access processor.

* * * * *